(12) United States Patent
Graumueller

(10) Patent No.: US 11,719,173 B2
(45) Date of Patent: Aug. 8, 2023

(54) METHOD AND GAS FUEL INJECTION UNIT FOR OPERATING AN INTERNAL COMBUSTION ENGINE

(71) Applicant: Caterpillar Motoren GmbH & Co. KG, Kiel (DE)

(72) Inventor: Robert Graumueller, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 17/778,761

(22) PCT Filed: Nov. 12, 2020

(86) PCT No.: PCT/EP2020/025510
§ 371 (c)(1),
(2) Date: May 20, 2022

(87) PCT Pub. No.: WO2021/098983
PCT Pub. Date: May 27, 2021

(65) Prior Publication Data
US 2023/0014909 A1    Jan. 19, 2023

(30) Foreign Application Priority Data

Nov. 22, 2019    (GB) ...................................... 1917070

(51) Int. Cl.
*F02D 19/02*    (2006.01)
*F02D 41/00*    (2006.01)
(Continued)

(52) U.S. Cl.
CPC ....... *F02D 19/022* (2013.01); *F02D 41/0027* (2013.01); *F02M 21/0245* (2013.01); *F02M 21/0248* (2013.01); *F02D 41/401* (2013.01)

(58) Field of Classification Search
CPC ............... F02M 37/0029; F02M 59/46; F16K 17/0433; F16K 17/065; F16K 17/082
See application file for complete search history.

(56) References Cited

U.S. PATENT DOCUMENTS

| | | | | |
|---|---|---|---|---|
| 3,146,765 A | * | 9/1964 | Bush ....................... | F02B 71/00 123/46 R |
| 4,324,211 A | * | 4/1982 | Strong .................... | F02B 19/06 123/262 |

(Continued)

FOREIGN PATENT DOCUMENTS

| | | |
|---|---|---|
| CN | 109098835 B | 11/2020 |
| EP | 2706214 A1 | 3/2014 |

(Continued)

OTHER PUBLICATIONS

International Search Report related to Application No. PCT/EP2020/025510; dated Feb. 25, 2021.

(Continued)

*Primary Examiner* — John Kwon

(57) ABSTRACT

The present invention relates to a method for operating an internal combustion engine provided as a medium-speed gas engine or dual fuel engine in a gas fuel mode. The method comprises the step of directly injecting a gas fuel into a combustion chamber of the engine at a maximum injection pressure that is lower than a compression-end pressure of the engine.

15 Claims, 3 Drawing Sheets

(51) Int. Cl.
*F02M 21/02* (2006.01)
*F02D 41/40* (2006.01)

(56) References Cited

U.S. PATENT DOCUMENTS

| | | |
|---|---|---|
| 4,781,164 A | 11/1988 | Seeber et al. |
| 5,941,210 A | 8/1999 | Hill et al. |
| 6,095,101 A | 8/2000 | Pedersen |
| 7,819,096 B2 | 10/2010 | McConville et al. |
| 8,505,517 B2 | 8/2013 | Gatellier et al. |
| 10,393,070 B2 | 8/2019 | Ulrey et al. |
| 2003/0140902 A1 | 7/2003 | Seifert et al. |
| 2004/0154580 A1* | 8/2004 | Eismark ............... F02M 47/027 123/305 |
| 2007/0023005 A1* | 2/2007 | Chmela ................. F02M 26/06 123/305 |
| 2013/0247867 A1 | 9/2013 | Shmueli et al. |
| 2016/0169147 A1* | 6/2016 | Surnilla .............. F02D 41/2461 123/299 |

FOREIGN PATENT DOCUMENTS

| | | |
|---|---|---|
| EP | 2860376 A1 | 4/2015 |
| EP | 2776690 B1 | 5/2016 |
| EP | 2740918 B1 | 5/2017 |
| GB | 2444405 A | 6/2008 |
| JP | H08291769 A | 11/1996 |
| JP | 2016006325 A | 1/2016 |
| KR | 101629608 B1 | 6/2016 |
| WO | 2012021990 A1 | 2/2012 |

OTHER PUBLICATIONS

Great Britain Search Report related to Application No. 1917070.3; dated Apr. 14, 2020.

* cited by examiner

METHOD AND GAS FUEL INJECTION UNIT FOR OPERATING AN INTERNAL COMBUSTION ENGINE

CROSS-REFERENCE TO RELATED APPLICATION

This Application is a 35 USC § 371 US National Stage filing of International Application No. PCT/EP2020/025510 filed on Nov. 12, 2020 which claims priority under the Paris Convention to Great Britain Patent Application No. No, 1917070.3 filed on Nov. 22, 2019.

TECHNICAL FIELD

The present invention relates to a method for operating an internal combustion engine provided as a medium-speed gas engine or a dual fuel engine in a gas fuel mode. Further, the present invention relates to a gas fuel injection unit for use in an internal combustion engine provided as a medium-speed gas engine or as a dual fuel engine when being operated in a gas fuel mode and to an internal combustion engine which is equipped with such a gas fuel injection unit.

TECHNOLOGICAL BACKGROUND

For operating vessels at a relatively low emission level, the use of medium-speed gas engines is known. Further, the use of reciprocating internal combustion engines operated as dual fuel engines is known which can be run on both gas as well as liquid fuels. Typically, such engines may be operated in a gas fuel mode and a liquid fuel mode as described in EP 2 706 214 A1.

In the gas fuel mode, known dual fuel engines are designed to combust predominantly gas fuel, such as natural gas, but typically with a small percentage of liquid fuel, e.g. diesel, as pilot fuel to start ignition. By doing so, the engine may operate based on a combustion process that is a cross between the Diesel cycle and the Otto cycle. More specifically, in the gas fuel mode of known dual fuel engines, a gas-air mixture is submitted to a cylinder of the engine during an intake stroke via an intake valve, then compressed during a compression stroke, wherein at the top of the compression stroke the pilot fuel is injected and ignites spontaneously, thereby igniting the gas-air mixture to create power expansion.

In the liquid fuel mode by contrast, liquid fuel, such as diesel fuel, is supplied into the engine cylinder as the sole fuel, i.e. source of energy, during combustion. In this mode, the engine typically operates according to the Diesel cycle, wherein the liquid fuel may be directly injected into the combustion chamber.

An advantage of dual fuel engines is that they provide a certain degree of fuel flexibility, thereby adding to the security of energy supply. Further, when being operated in the gas fuel mode, dual fuel engines may typically ensure low emission levels. As a result, dual fuel engines are thus increasingly used in vessels, i.e. as main or auxiliary engines, in order to fulfill IMO Tier 3 requirements.

Known dual fuel engines are usually operated such that, at the beginning of the intake stroke, the cylinder is flushed with a small amount of the gas-air mixture. In this way, the cylinder is cooled so as to prevent the combustion chamber from being subjected to too high combustion temperatures which, e.g., may contribute to an increased amount of nitrogen oxides in the exhaust gas of the engine.

For flushing the cylinder with the gas-air mixture, the inlet valve and the outlet valve of the cylinder typically remain open for some overlapping time period during the intake stroke. However, by doing so, a small amount of gas fuel present in the gas-air mixture is expelled from the cylinder before being combusted and thereby released into the ambient environment. As a result, the engine may expel greenhouse gases during its operation. In the context of internal combustion engines, the expelling of uncombusted fuel from the cylinder is generally also referred to as "fuel slip".

Since environmental sustainability is gaining in importance, latest developments aim on further increasing efficiency and decreasing pollutant emissions, i.e. greenhouse gas emissions, of such engines.

SUMMARY OF THE INVENTION

It is thus an objective of the present invention to provide a method and a gas fuel injection unit which enable operating an internal combustion engine provided as a medium-speed gas engine or a dual fuel engine in a more efficient manner, i.e. more environmentally friendly. To that end, it is an objective to provide an internal combustion engine provided as a medium-speed gas engine or a dual fuel engine which is equipped with such a gas fuel injection unit.

These objectives are solved by means of a method, a gas fuel injection unit, and an internal combustion engine being equipped with such a gas fuel injection unit as defined in the independent claims. Preferred embodiments are set forth in the present specification, the Figures as well as the dependent claims.

Accordingly, a method for operating an internal combustion engine provided as a medium-speed gas engine or a dual fuel engine in a gas fuel mode is provided. The method comprises the step of directly injecting a gas fuel into a combustion chamber of the engine at a maximum injection pressure that is lower than a compression-end pressure of the engine.

Furthermore, a gas fuel injection unit for use in an internal combustion engine provided as a medium-speed gas engine or dual fuel engine when being operated in a gas fuel mode is provided. The gas fuel injection unit comprises a gas fuel injection valve configured for directly injecting a gas fuel into a combustion chamber of the engine and a gas fuel feed unit configured for supplying pressurized gas fuel to the gas fuel injection valve at a maximum injection pressure that is lower than a compression-end pressure of the engine.

To that end, an internal combustion engine provided as a medium-speed gas engine or as a dual fuel engine is provided which is equipped with such a gas fuel injection unit.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
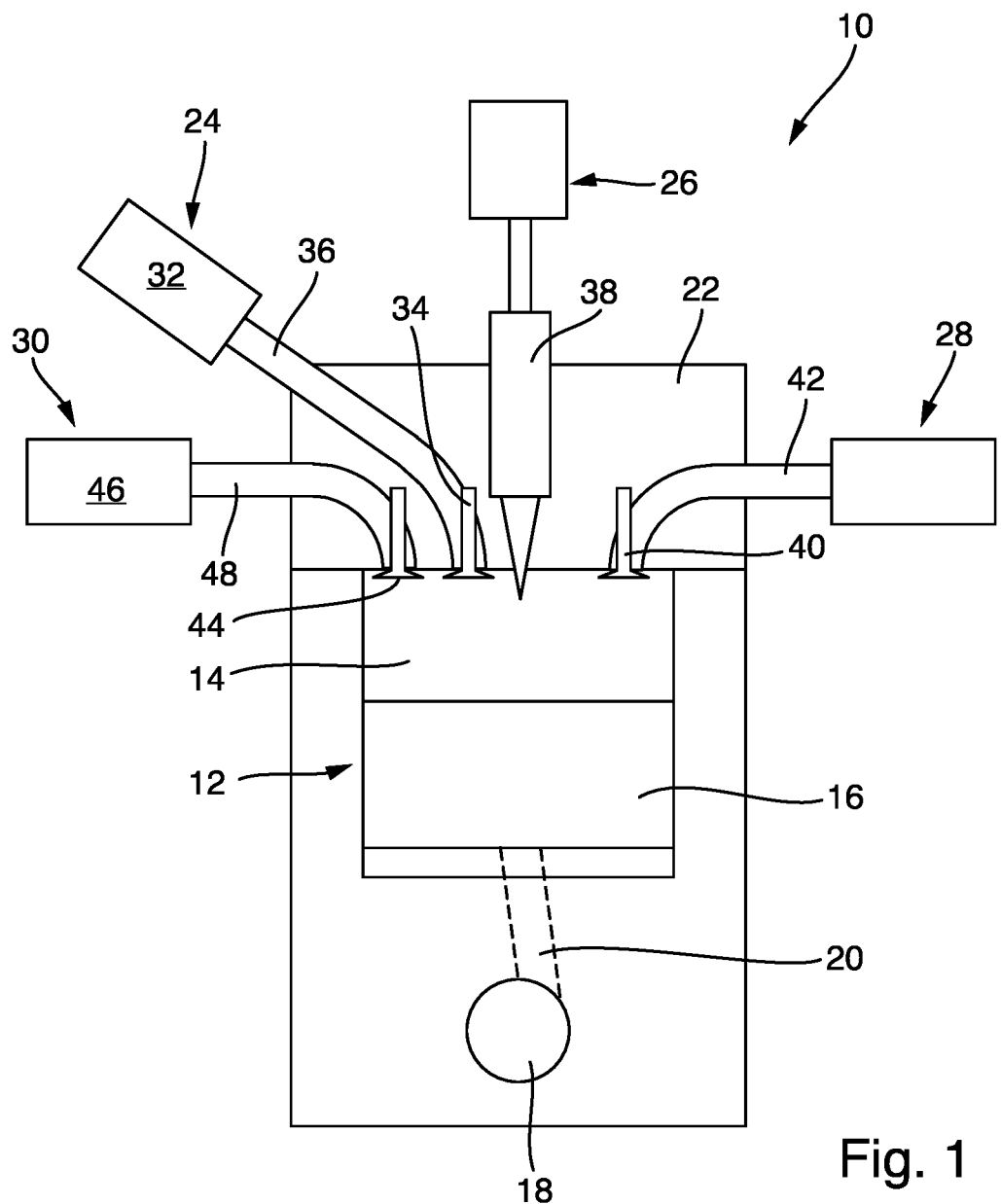
FIG. 1 shows a schematic drawing of an internal combustion engine which is equipped with a gas fuel injection unit.

In the following, the invention will be explained in more detail with reference to the accompanying Figures, in which like elements are denoted by identical reference numerals and repeated description thereof may be omitted in order to avoid redundancies.

FIG. 1 schematically shows a reciprocating internal combustion engine 10, also referred to as "engine" in the following, which can be installed in a vehicle, such as a vessel, as a main or auxiliary engine or which can be utilized in power plants. In the shown configuration, the engine 10 is provided as a dual fuel engine. In the context of the present disclosure, the term "dual fuel engine" refers to a reciprocating internal combustion engine which is designed to run on both gas fuel and liquid fuel.

The term "gas fuel" refers to a gaseous fuel, i.e. which under ordinary conditions is in a gaseous state. The gas fuel may comprise flammable hydrocarbon gases, such as methane, propane, butane or a mixture thereof. For example, the gas fuel may be provided as liquefied petroleum gas, natural gas, biogas or any other suitable gas that may be used as a gaseous fuel. In the engine 10, the gas fuel may be processed or stored in a compressed and liquefied state.

The term "liquid fuel" refers to a fuel which under ordinary conditions is in a liquid state. The liquid fuel may be provided as diesel, biodiesel, fuel oil, such as heavy fuel oil, or any other fuel that may be used as a liquid fuel in the engine 10.

The engine 10 is configured for being operated in a gas fuel mode and in a liquid fuel mode. Specifically, in the gas fuel mode, the engine 10 is designed to combust predominantly gas fuel but preferably with a small amount or percentage of a liquid fuel as a pilot fuel to start ignition. In the liquid fuel mode, the engine 10 is designed to combust solely the liquid fuel to create power expansion.

In the following, the structural arrangement of the engine 10 is specified. The engine 10 comprises at least one, preferably a plurality of cylinders 12, e.g. eight, twelve or eighteen cylinders, which may be arranged in an inline-configuration, a V-configuration or any other known cylinder configuration. Each cylinder 12 is provided with a combustion chamber 14 delimited by a piston 16 accommodated in the cylinder 12. The piston 16 is configured for reciprocating and axial movement within the cylinder 12 and is connected to a crankshaft 18 of the engine 10 via a connecting rod 20. The cylinder 12 is covered by a cylinder head 22 which further delimits the combustion chamber 14.

The engine 10 further comprises a control device (not shown) which controls actuation of the engine 10 and its components. Specifically, the control device is configured for controlling a supply of a demanded fuel-air mixture into the combustion chamber 14. In this shown configuration, the fuel-air mixture is provided by mixing a fuel medium, i.e. the gas fuel and/or the liquid fuel, with intake air, i.e. charged intake air, within the combustion chamber 14. Further, the control device is configured for controlling ignition of the supplied fuel-air mixture within the combustion chamber 14 so as to produce high-temperature and high-pressure gases which apply forces to and thus axially move the piston 16, thereby rotating the crankshaft 18. To that end, the control device is configured for controlling the expelling of combustion gases from the combustion chamber 14 after combustion took place.

More specifically, for controlling the above described gas exchange and combustion within the cylinder 12 during operation, the engine 10 comprises a charge air supply unit 24, a liquid fuel injection unit 26, an exhaust gas expel unit 28 and a gas fuel injection unit 30.

As to substance, the charge air supply unit 24 is configured for guiding charged air into the combustion chamber 14. Accordingly, the charge air supply unit 24 comprises a charge air feed unit 32 for providing charged intake air which is guided through an intake air valve 34 via a charge air line 36. The intake air valve 34 opens into the combustion chamber 14 and is configured to adjust the supply of charged air thereinto. The charge air feed unit 32 may comprise at least one turbocharger unit configured for pressurizing and thereby charging intake air guided therethrough, i.e. fresh air from outside the engine 10, which is then fed into the charge air line 36.

The liquid fuel injection unit 26 is configured for injecting liquid fuel into the combustion chamber 14. For doing so, the liquid fuel injection unit 26 comprises a liquid fuel injection valve 38 which is configured for directly injecting liquid fuel into the combustion chamber 14 of the engine 10. The liquid fuel injection unit 26 may further comprise a fuel pump configured to suction liquid fuel form a storage reservoir or tank and to pressurize the thus received liquid fuel which is then guided to the liquid fuel injection valve 38. Specifically, during operation of the engine 10, the pressurized liquid fuel supplied to the liquid fuel injection valve 38 may be elevated to a minimum pressure level by means of the fuel pump that is higher than a compression-end pressure of the engine 10.

In the context of the present disclosure, the term "compression-end pressure" refers to a pressure prevailing in the combustion chamber 14 before, particularly immediately before, ignition is initiated. More specifically, the compression-end pressure may refer to a pressure prevailing in the combustion chamber 14 when the cylinder 12 is positioned in its top dead center during operation.

The exhaust gas expel unit 28 is configured for expelling combustion gases from the combustion chamber 14, i.e. after combustion of the fuel-air mixture. For controlling the expelling of combustion gases, an exhaust valve 40 is provided which variedly opens and closes an aperture of an exhaust gas line 42 opening into the combustion chamber 14.

The basic structure and basic mode of operation of the engine 10 and its components, i.e. control device, the charge air supply unit 24, the liquid fuel injection unit 26 and the exhaust gas expel unit 28, are well known to a person skilled in the art and are thus not further specified. Rather, characteristics of the engine 10, i.e. its gas fuel injection unit 30, and its operation interlinked with the present invention are addressed in the following.

As set forth above, the engine 10 comprises the gas fuel injection unit 30 configured for injecting pressurized gas fuel into the combustion chamber 14. The term "pressurized gas fuel" refers to compressed or pressurized liquefied gas fuel and/or to a compressed or pressurized gaseous gas fuel.

Specifically, the gas fuel injection unit 30 comprises a gas fuel injection valve 44 which is configured for directly injecting the gas fuel into the combustion chamber 14 of the engine 10.

In the context of the present disclosure, the expression "directly injecting gas fuel into the combustion chamber 14" means that the gas fuel is injected into the combustion chamber 14 prior to being mixed with charged air or intake air. In other words, in the proposed configuration, gas fuel is not premixed with air, e.g. in a separate intake port, prior to being supplied into the combustion chamber 14. For doing so, the gas fuel injection valve 44 is arranged such that it opens into the combustion chamber 14, as can be gathered from FIG. 1.

By suggesting an engine 10 configured to directly inject gas fuel into its combustion chamber 14, the supply of gas fuel into the combustion chamber 14 and thereby charge changing and combustion may be controlled more precisely which allows for operating the engine 10 in a more efficient manner.

The gas fuel injection unit 30 further comprises a gas fuel feed unit 46 which is configured for supplying pressurized gas fuel to the gas fuel injection valve 44. Specifically, as will be set forth below in more detail, the gas fuel feed unit 46 is configured for supplying pressurized gas fuel to the gas fuel injection valve 44 at a maximum injection pressure that is lower than the compression-end pressure of the engine 10.

In the context of the present disclosure, the term "injection pressure" refers to a pressure prevailing in the pressurized gas fuel when being discharged from the gas fuel injection valve 44 into the combustion chamber 14.

Further, for enabling injection of the gas fuel into the combustion chamber 14, the pressurized gas fuel has an injection pressure, i.e. a maximum injection pressure, that is greater than an actual pressure prevailing in the combustion chamber 14 when being injected into the combustion chamber 14 by virtue of the gas fuel injection valve 44. In other words, during an injection event of the gas fuel, the injection pressure of the pressurized gas fuel when being expelled from the gas fuel injection valve 44 is greater than a pressure prevailing in the combustion chamber 14.

For providing pressurized gas fuel, the gas fuel feed unit 46 may comprise a gas compressor or pump (not shown) for pressurizing gas fuel to be supplied to the gas fuel injection valve 44. Specifically, the gas compressor or pump may be of any type that can suction gas fuel from a storage tank and pump the thus received gas fuel under an elevated pressure through a gas fuel line 48 to the gas fuel injection valve 44. The gas compressor or pump may be further configured for being driven by the engine 10 or an electric motor. Accordingly, the gas fuel feed unit 46 may further comprise a gas fuel storage tank (not shown) configured to store gas fuel in a liquefied state which may be fluid-communicatively connected to the gas compressor or pump. For example, the gas fuel storage tank may be configured to store the gas fuel at a storage pressure of about 2 bar to 16 bar.

Figure 2:
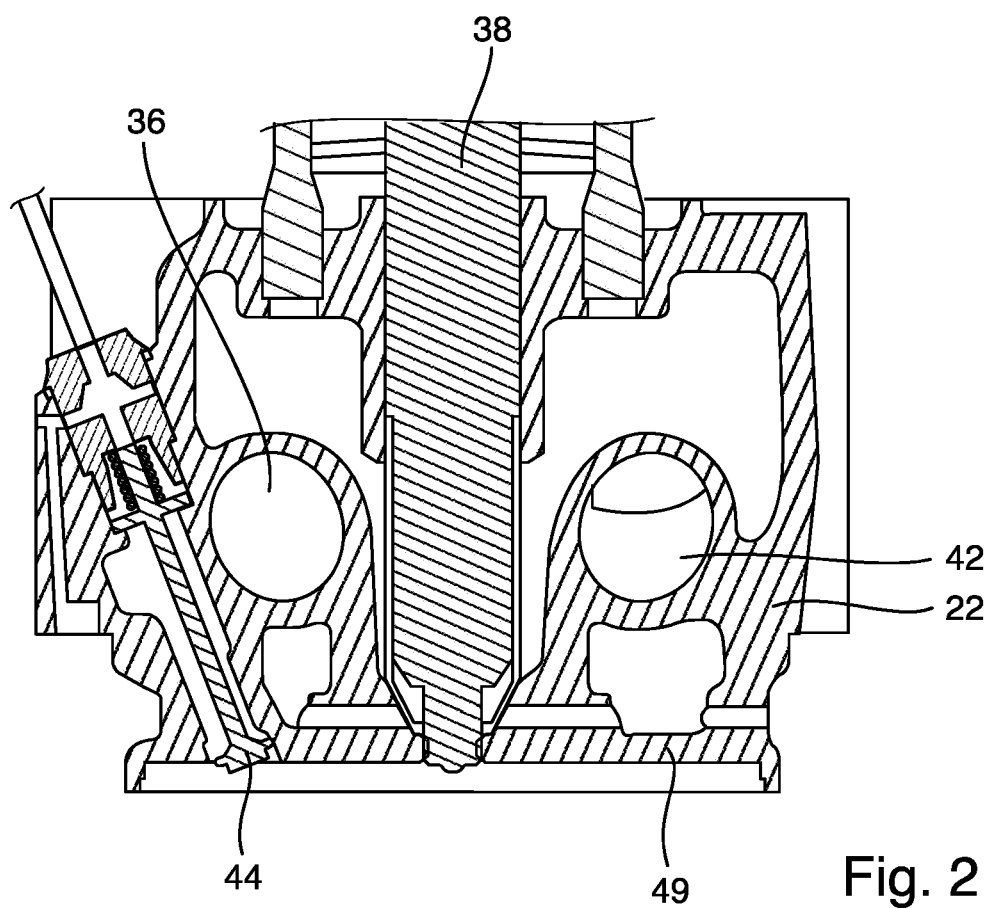
FIG. 2 shows a schematic longitudinal section view of a cylinder head of the engine according to a first embodiment.

FIG. 2 schematically shows a longitudinal section view of the engine's cylinder head 22 according to a first embodiment. As set forth above, the gas fuel injection valve 44 is arranged such that it opens into the combustion chamber 14. For doing so, in the shown configuration, the gas fuel injection valve 44 is integrated in the cylinder head 22. Specifically, as can be gathered from FIG. 2, the gas fuel injection valve 44 opens into the combustion chamber 14 at a lateral region, more specifically at a lateral top region of the combustion chamber 14. In other words, the gas fuel injection valve 44 is laterally arranged within a section 49 of the cylinder head 22 which delimits the combustion chamber 14.

Figure 3:
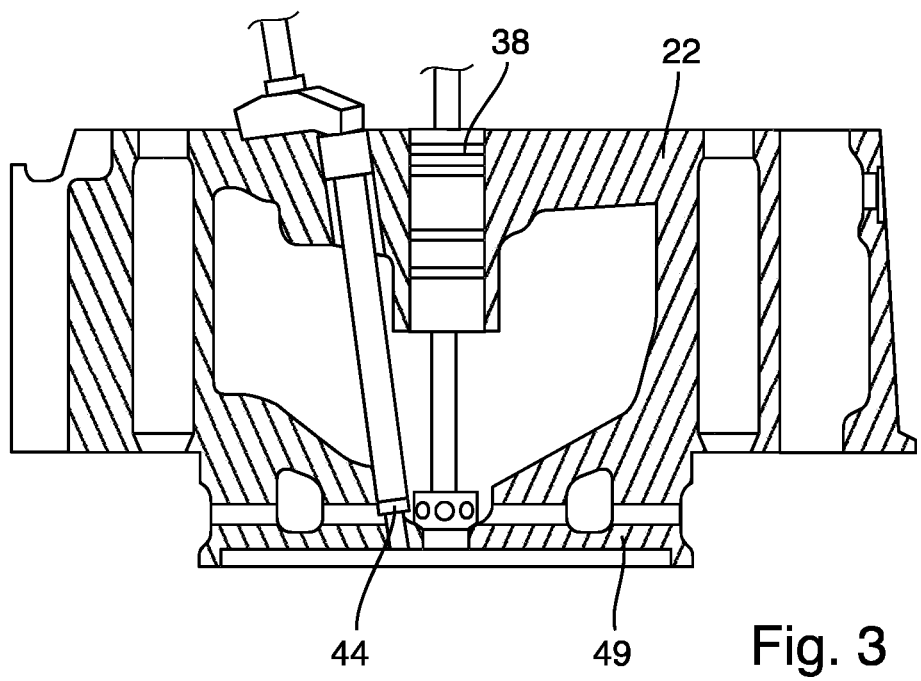
FIG. 3 shows a schematic longitudinal section view of the cylinder head of the engine according to a second embodiment.

FIG. 3 schematically shows a longitudinal section view of the engine's cylinder head 22 according to a second embodiment. Compared to the embodiment depicted in FIG. 2, the gas fuel injection valve 44 is integrated in the cylinder head 22 such that it opens into the combustion chamber 14 at a central region, more specifically at a central top region of the combustion chamber 14. In other words, the gas fuel injection valve 44 is centrally arranged within the section 49 of the cylinder head 22 which delimits the combustion chamber 14. In the shown configuration, the gas fuel injection valve 44 is provided separately from the liquid fuel injection valve 38. Specifically, as can be gathered from FIG. 3, the gas fuel injection valve 44 is arranged adjacent to the liquid fuel injection valve 38. Alternatively, the gas fuel injection valve 44 and the liquid fuel injection valve 38 may be combined such that the gas fuel and the liquid fuel can be injected into the combustion chamber 14 via the same valve opening or aperture provided in the cylinder head 22. In such a configuration, the valve opening may open into a pre-combustion chamber such that gas or liquid fuel injected via the valve opening is guided through the pre-combustion chamber before being directed into the combustion chamber 14.

The gas fuel injection unit 30 further comprises an actuating unit (not shown) which is configured to control actuation of the gas fuel injection valve 44 within an engine cycle of the engine's cylinder 12. The term "engine cycle" refers to a repeated and predefined sequence of strokes of the engine's cylinder 12, during which the cylinder's piston 16 reciprocatingly moves between its bottom dead centre and its top dead centre.

In the following, the operation of the engine 10, in particular with regard to its gas fuel injection unit 30, is further specified under reference to FIG. 4 which shows a diagram illustrating injection events during an engine cycle when the engine 10 is operated in the gas fuel mode.

Figure 4:
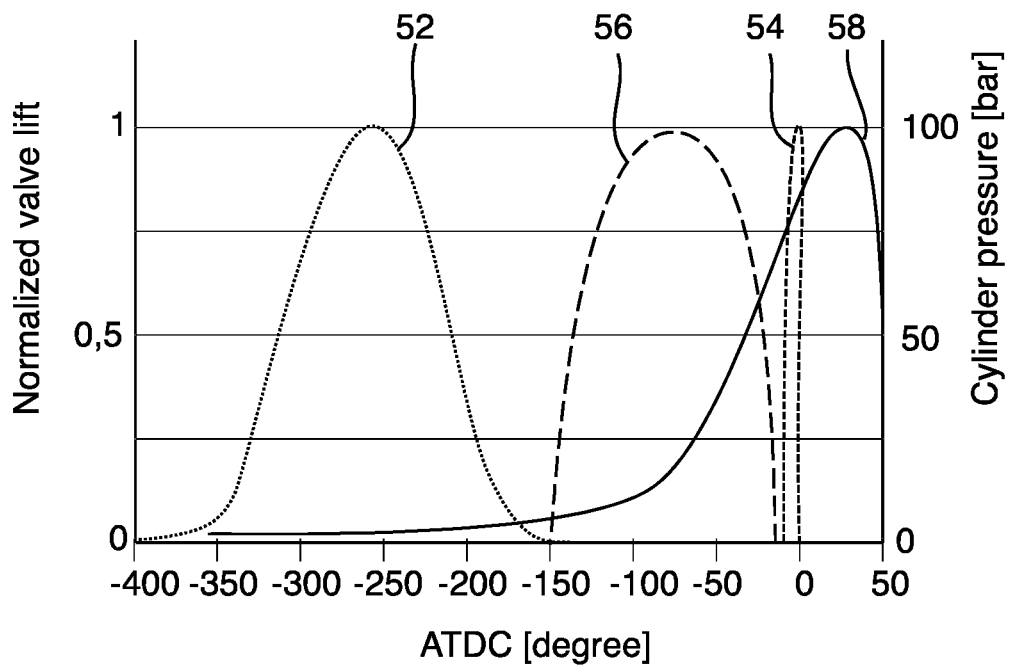
FIG. 4 shows a diagram illustrating injection events during an engine cycle of a cylinder of the engine.

Specifically, in the diagram depicted in FIG. 4, the abscissa of the diagram depicts a crank angle denoted in degrees after top dead centre (ATDC). The ordinate on the left hand side of the diagram depicts the associated normalized lift of the respective valves, i.e. the intake air valve 34, the liquid fuel injection valve 38 and the gas fuel injection valve 44, wherein the ordinate on the right hand side depicts the associated cylinder pressure prevailing in the combustion chamber 14. More specifically, in order to illustrate the normalized lift of the respective valves, the diagram comprises an intake air valve lift curve 52 depicting the lift of the intake air valve 34, a liquid fuel injection valve lift curve 54 depicting the lift of the liquid fuel injection valve 34 and a gas fuel injection valve lift curve 56 depicting the lift of the gas fuel injection valve 44 during the engine cycle. Further, in order to illustrate the cylinder pressure prevailing in the combustion chamber 14, the diagram further comprises a cylinder pressure curve 58 illustrating the pressure level prevailing in the combustion chamber 14 during the engine cycle.

As set forth above, during operation of the engine 10, gas fuel is directly injected into the combustion chamber 14 at a maximum injection pressure that is lower than the compression-end pressure of the engine. This step is illustrated in FIG. 4 by means of the gas fuel injection valve lift curve 56. During the engine cycle, the step of injecting the gas fuel is started when the exhaust valve 40 for discharging exhaust gas from the combustion chamber 14 is in a closed state. In other words, the actuating unit of the gas fuel injection unit 30 is configured to actuate the gas fuel injection valve 44 such that injection of the gas fuel into the combustion chamber 14 is prevented when the exhaust valve 40 is operated in an open position. Accordingly, the actuating unit of the gas injection unit 30 is configured to actuate the gas fuel injection valve such that injection of the gas fuel into the combustion chamber 14 is performed when the exhaust valve 40 is operated in a closed position.

In this way, slip of gas fuel, i.e. uncombusted gas fuel, maybe effectively prevented, thereby contributing to a more efficient and a more environmentally friendly operation of the engine.

As can be gathered from FIG. 4, within the engine cycle, the step of injecting the gas fuel is performed prior to the step of initiating ignition in the combustion chamber which, in the shown configuration, is performed by injecting the liquid fuel as pilot fuel into the combustion chamber 14. In other words, the actuating unit of the gas fuel injection unit 40 is configured to actuate the gas fuel injection valve 44 such that, within the engine cycle of the cylinder 12, the gas fuel injection valve 44 is operated in an open position for injecting gas fuel into the combustion chamber 14 before ignition in the combustion chamber 14 is initiated. Further, the actuating unit is configured to actuate the gas fuel injection valve 44 such that, within the engine cycle, the gas fuel injection valve 44 is operated in a closed position for preventing injection of gas fuel into the combustion chamber 14 when ignition in the combustion chamber is initiated.

As set forth above, in the shown configuration, ignition of the fuel-air mixture in the combustion chamber 14 is initiated by injecting the liquid fuel as pilot fuel into the combustion chamber 14 which is illustrated in the diagram depicted in FIG. 4 by means of the liquid fuel injection valve lift curve 54. Alternatively, ignition of the fuel-air mixture in the combustion chamber 14 may be initiated by means of a high-voltage spark discharged into the combustion chamber 14 or into its pre-chamber. Specifically, such an ignition procedure may be also implemented in a medium-speed gas engine.

In the step of directly injecting the gas fuel, the gas fuel is injected at a maximum injection pressure that is not more than three-fourths or half of the compression-end pressure of the engine 10 and that is more than twice of till equal to the actual compression pressure prevailing in the combustion chamber 14 which is associated to the corresponding crank angle degree position. In the shown configuration, the compression-end pressure of the engine 10 may be less than 250 bar, in particular less than 200 bar. For example, the compression-end pressure may be 150 bar. The gas fuel may be injected at a maximum injection pressure in the range of 5 bar to 100 bar. Specifically, the gas fuel may be injected at a maximum injection pressure in the range of 10 bar to 50 bar. Since, in the proposed solution, the maximum injection pressure is relatively low compared to known fuel injection devices, the proposed gas fuel injection unit 30 may have a less complex design.

As can be gathered from the diagram depicted in FIG. 4, the step of injecting the gas fuel is performed in the range of −150° to −15° ATDC. Alternatively, the step of injecting the gas fuel into the combustion chamber 14 may be performed in the range of −360° to −15° ATDC. Specifically, for ensuring that the step of injecting the gas fuel is completed prior the step of igniting the fuel-air mixture within the engine cycle, the step of injecting the gas fuel is completed at −15° ATDC.

In an alternative embodiment, the engine 10 may be provided as a medium-speed gas engine. In the context of the present disclosure, the term "medium-speed gas engine" refers to an internal combustion engine run on gaseous fuel and which operates at a speed in the range of 500 rpm to 1400 rpm, preferably at speed about 750 rpm or 1000 rpm. Typically, such engines are operated in a gas fuel mode, in which gas fuel as a sole fuel is combusted in the combustion chamber.

When being provided as a medium-speed gas engine, the use of the above described liquid fuel injection unit in the engine 10 is omitted. Instead, the engine 10 is provided with a spark plug unit which is configured to initiate ignition of the fuel-air mixture in the combustion chamber 14 by means of a high-voltage spark discharged into the combustion chamber 14 or into the pre-chamber. Within its corresponding engine cycle, the step of directly injecting the gas fuel is preferably performed at the same timing and with the same injecting pressure as described above, particularly as described in connection with FIG. 4.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

A method for operating an internal combustion engine provided as a medium-speed gas engine or as a dual fuel engine in a gas fuel mode may be provided. The method may comprise the step of directly injecting a gas fuel into a combustion chamber of the engine at a maximum injection pressure that is lower than a compression-end pressure of the engine.

By suggesting a method in which gas fuel is directly injected into the combustion chamber of the engine, the supply of gas fuel, i.e. with regard to its timing and amount, may be controlled more precisely compared to known engines, e.g. known dual fuel engines, in which gas fuel is premixed with intake air before being directed into the combustion chamber.

The suggested method may be used for operating engines which serve as main or auxiliary engines in vessels or power plants. However, the method is not limited to these applications.

In a further development, the method may be provided such that, within an engine cycle of a cylinder of the engine, the step of directly injecting the gas fuel into the combustion chamber is started when an exhaust valve of the engine for discharging or expelling exhaust gas from the combustion chamber is in a closed state.

In this way, the suggested method may prevent that, at the beginning of an intake stroke within the engine cycle, uncombusted gas fuel is discharged via the exhaust valve. In other words, slip of uncombusted gas fuel may be prevented. As a result, the suggested method may contribute to an operation of the engine which is more environmentally friendly.

The method may further comprise a step of initiating ignition of a fuel-air mixture in the combustion chamber, wherein within the engine cycle of the cylinder, the step of directly injecting the gas fuel may be performed prior to the step of initiating ignition in the combustion chamber.

Specifically, when the engine is provided as a dual fuel engine, the step of initiating ignition in the combustion chamber may be performed by injecting a pilot fuel, e.g. a liquid fuel, into the combustion chamber. Alternatively or additionally, the step of initiating ignition in the combustion chamber may be performed by discharging a high-voltage spark into the combustion chamber or into a pre-chamber thereof.

When the engine is provided as a medium-speed gas engine, the step of initiating ignition in the combustion chamber may be performed by discharging a higher-voltage spark into the combustion chamber or into a pre-chamber thereof.

In a further development, the step of directly injecting the gas fuel may be performed such that the gas fuel is injected at a maximum injection pressure that is not more than three-fourths or half of the compression-end pressure of the engine. Further, the maximum injection pressure may be more than twice of the equal to an actual compression pressure of the engine prevailing in the combustion chamber during the injection event.

Alternatively or additionally, the step of directly injecting the gas fuel may be performed such that the gas fuel is injected at an maximum injection pressure in the range of 5 bar to 100 bar, in particular in the range of 10 bar to 50 bar. Further, the compression-end pressure of the engine may be less than 250 bar, in particular less than 200 bar or 150 bar.

In a further development, the step of injecting the gas fuel may be performed in the range of 360° to 15° before top dead centre of the cylinder within the engine cycle. Further, the step of directly injecting the gas fuel may be performed such that it is completed at 15° or 30° before top dead centre of the cylinder.

Furthermore, a gas fuel injection unit for use in an internal combustion engine provided as a medium-speed gas engine or dual fuel engine when being operated in a gas fuel mode may be provided. The gas fuel injection unit may comprise a gas fuel injection valve configured for directly injecting a gas fuel into a combustion chamber of the engine, and a gas fuel feed unit configured for supplying pressurized gas fuel to the gas fuel injection valve at a maximum injection pressure that is lower than a compression-end pressure of the engine.

The gas fuel injection unit may particularly be used in the performing the above described for operating the engine. Accordingly, technical features which are described in connection with the above method may also relate and be applied to the proposed gas fuel injection unit, and vice versa.

The gas fuel injection unit may further comprise an actuating unit configured to control actuation of the gas fuel injection valve within an engine cycle of a cylinder of the engine, wherein the actuating unit may be configured to actuate the gas fuel injection valve such that injection of gas fuel into the combustion chamber is prevented when an exhaust valve of the cylinder is operated in an open position.

Further, the actuating unit may be configured to actuate the gas fuel injection valve such that, within the engine cycle of a cylinder of the engine, the gas fuel injection valve is operated in an open position for injecting gas fuel into the combustion chamber before ignition in the combustion chamber is initiated and is operated in a closed position for preventing injection of gas fuel into the combustion chamber when ignition in the combustion chamber is initiated.

The gas fuel feed unit may comprise a gas compressor configured for pressurizing gas fuel to be supplied to the gas fuel injection valve. Further, the gas compressor may be configured for being driven by the engine or an electric motor.

The gas fuel injection valve may be integrated in a cylinder head of the engine such that, in a mounted state in the engine, the gas fuel injection valve opens into the combustion chamber at a lateral or central region of the combustion chamber.

Furthermore, an internal combustion engine may be provided. The internal combustion engine preferably is provided as a medium-speed gas engine or dual fuel engine. Further, the engine may be equipped with a gas fuel injection unit as described above which is configured for directly injecting a gas fuel into a combustion chamber of the engine when the engine is operated in a gas fuel mode.

Since the proposed internal combustion engine is equipped with the above-described gas fuel injection unit, technical features which are described in connection with the above method or gas fuel injection unit may also relate and be applied to the proposed internal combustion engine, and vice versa.

INDUSTRIAL APPLICABILITY

With reference to the Figures and their accompanying description, a method for operating an internal combustion engine and a corresponding gas fuel injection unit are suggested. The method and the gas fuel injection unit as mentioned above are applicable in internal combustion engines provided as a medium-speed gas engine or as a dual fuel engine. The suggested method may replace conventional operating methods. Accordingly, the suggested gas fuel injection unit may replace conventional gas fuel supply units and may serve as a replacement or retrofit part.

The invention claimed is:

1. A method for operating an internal combustion engine provided as a medium-speed gas engine or dual fuel engine in a gas fuel mode, comprising the step of directly injecting a gas fuel into a combustion chamber of the engine at a maximum injection pressure that is lower than a compression-end pressure of the engine.

2. The method according to claim 1, wherein within an engine cycle of a cylinder of the engine, the step of directly injecting the gas fuel is started when an exhaust valve of the cylinder for discharging exhaust gas form the combustion chamber is in a closed state.

3. The method according to claim 1, further comprising a step of initiating ignition of a fuel-air mixture in the combustion chamber, wherein within the engine cycle of the cylinder, the step of directly injecting the gas fuel is performed prior to the step of initiating ignition in the combustion chamber.

4. The method according to claim 3, wherein the step of initiating ignition in the combustion chamber is performed by injecting a pilot fuel into the combustion chamber.

5. The method according to claim 1, wherein in the step of directly injecting the gas fuel, the gas fuel is injected at a maximum injection pressure that is not more than three-fourths or half of the compression-end pressure of the engine.

6. The method according to claim 1, wherein in the step of directly injecting the gas fuel, the gas fuel is injected at a maximum injection pressure in the range of 5 bar to 100 bar, in particular in the range of 10 bar to 50 bar.

7. The method according to claim 1, wherein the compression-end pressure of the engine is less than 250 bar, in particular less than 200 bar or 150 bar.

8. The method according to claim 1, wherein within the engine cycle of the cylinder, the step of directly injecting the gas fuel is performed in a range of 360° to 15° before top dead centre of the cylinder.

9. The method according to claim 1, wherein within the engine cycle of the cylinder, the step of directly injecting the gas fuel is completed at 15° before top dead centre of the cylinder.

10. A gas fuel injection unit for use in an internal combustion engine provided as a medium-speed gas engine or dual fuel engine when being operated in a gas fuel mode, comprising:

a gas fuel injection valve configured for directly injecting a gas fuel into a combustion chamber of the engine, and a gas fuel feed unit configured for supplying pressurized gas fuel to the gas fuel injection valve at a maximum injection pressure that is lower than a compression-end pressure of the engine.

11. The gas fuel injection unit according to claim 10, further comprising an actuating unit configured to control actuation of the gas fuel injection valve within an engine cycle of a cylinder of the engine, wherein the actuating unit is configured to actuate the gas fuel injection valve such that injection of gas fuel into the combustion chamber is prevented when an exhaust valve of the cylinder is operated in an open position.

12. The gas fuel injection unit according to claim 11, wherein the actuating unit is configured to actuate the gas fuel injection valve such that, within the engine cycle of the cylinder of the engine, the gas fuel injection valve is operated in an open position for injecting gas fuel into the combustion chamber before ignition in the combustion chamber is initiated and is operated in a closed position for preventing injection of gas fuel into the combustion chamber when ignition in the combustion chamber is initiated.

13. The gas fuel injection unit according to claim 10, wherein the gas fuel feed unit comprises a gas compressor configured for pressurizing gas fuel to be supplied to the gas fuel injection valve and configured for being driven by the engine or an electric motor.

14. The gas fuel injection unit according to claim 10, wherein the gas fuel injection valve is integrated in a cylinder head of the engine such that, in a mounted state in the engine, the gas fuel injection valve opens into the combustion chamber at a lateral or central region of the combustion chamber.

15. A internal combustion engine provided as a medium-speed gas engine or dual fuel engine being equipped with a gas fuel injection unto according to claim 10 which is configured for directly injecting a gas fuel into a combustion chamber of the engine when the engine is operated in a gas fuel mode.

* * * * *